Jan. 11, 1927. Re. 16,525
E. ALTENKIRCH
REFRIGERATING APPARATUS OF THE ABSORPTION TYPE
Original Filed August 14, 1922
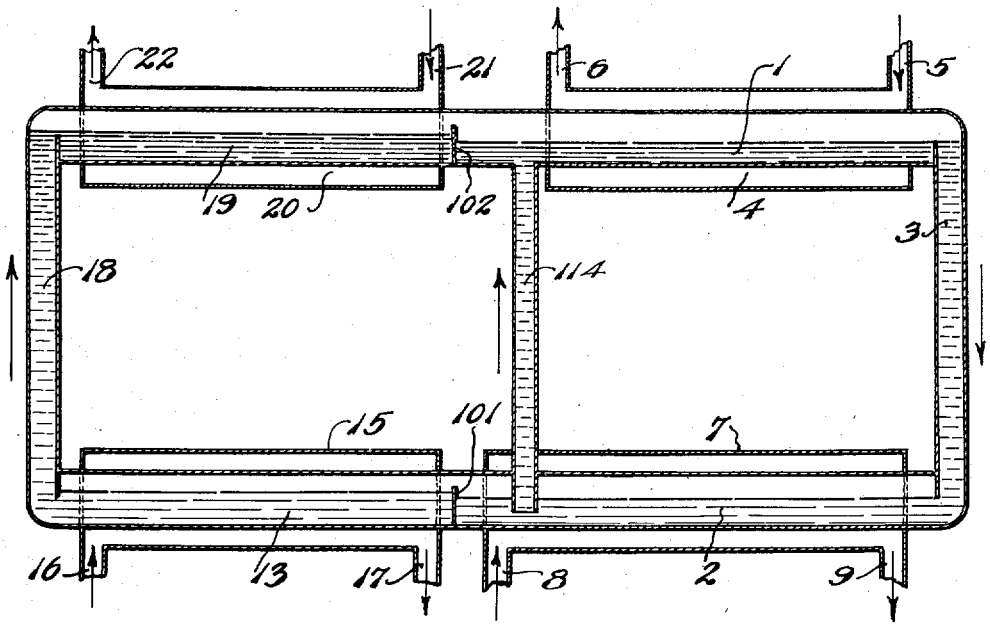
Inventor
Edmund Altenkirch
By Robb, Robb & Hill
Attorneys Reissued Jan. 11, 1927. Re. 16,525

UNITED STATES PATENT OFFICE.

EDMUND ALTENKIRCH, OF FREDERSDORF, NEAR ALT-LANDSBERG, GERMANY, ASSIGNOR TO SIEMENS-SCHUCKERTWERKE GESELLSCHAFT MIT BESCHRÄNKTER HAFTUNG, OF SIEMENSSTADT, NEAR BERLIN, GERMANY, A GERMAN CORPORATION.

REFRIGERATING APPARATUS OF THE ABSORPTION TYPE.

Original No. 1,455,701, dated May 15, 1923, Serial No. 581,775, filed August 14, 1922. Applicttion for reissue filed December 1, 1926. Serial No. 152,040.

This invention relates to refrigerating apparatus of the absorption type. In known apparatus of this type the gas-enriched liquid is caused to pass from the part of the apparatus termed the absorber by means of a pump into a high pressure chamber in which it is deprived of gas by heat, this chamber being herein termed the boiler. This pump is the most delicate part of the apparatus, and the chief object of the present invention is to render it unnecessary.

According to the invention the absorber is arranged at such a height above the inlet of the boiler that the column of liquid in a conduit interposed between the absorber and the boiler maintains the necessary difference of pressure between the said absorber and the said boiler.

In order that the said invention may be clearly understood and readily carried into effect the same will now be described more fully with reference to the accompanying drawings, in which:—

The figure is a section showing a constructional form of apparatus in accordance with the invention.

In the drawing, the absorber is indicated by 1 and the boiler is indicated by 2. The absorber and boiler are connected together by a pipe 3. A second pipe 114 which leads upwards to the absorber 1, dips at its lower end into the liquid contained in the boiler 2. The absorber 1 is surrounded by a cooling jacket 4 having an inlet 5 and an outlet 6 for the cooling medium. The boiler 2 is placed in a chamber 7 having an inlet opening 8 and an outlet opening 9 for the heating medium. Next to the boiler 2 is arranged the condenser 13 and between them is placed a partition 101 of such a height as to prevent any liquid from passing from one chamber into the other, whilst the gas spaces are in communication with each other. The condenser 13 is surrounded by a cooling device 15 having an inlet 16 and an outlet 17 for the cooling medium. Next to the absorber 1 is arranged the evaporator 19 with a partition 102 between the two to avoid any exchange of liquid, without however preventing the gases or vapours from passing over. A pipe 18 which opens into the evaporator 19, dips into the liquid contained in the condenser 13. The evaporator 19 is surrounded by a jacket 20 through which passes the medium to be cooled. The said medium is admitted at 21 and escapes at 22. The liquid used in the working of the apparatus can be any desired "binary" mixture which should be selected to suit the pressures employed in the apparatus and the temperatures to be ultimately obtained. For instance, sulphuric acid and water could be used, in which case the absorber 1 as well as the boiler 2 will contain a mixture of sulphuric acid and water, and the condenser 13 and the evaporator 19 pure water.

The working of the apparatus is as follows:—Owing to the heating to which the water and sulphuric acid mixture is subjected in the boiler 2 steam is expelled and passes into the condenser 13 in which the steam is condensed by cooling. A few bubbles of steam are also produced in the lower part of the pipe 114, and rise in the said pipe. This results in an upward movement of the liquid in the pipe 114, although at first the said movement will be a slow one. When the heated liquid reaches the upper part of the said pipe, its pressure will decrease, and owing to the said decrease of pressure more steam bubbles will be formed which will also rise in the pipe 114 and contribute to the upward movement of the liquid. As soon as the sulphuric acid deprived of water reaches the absorber 1, it is cooled by the cooling jacket 4. Consequently it absorbs the steam or water coming from the evaporator 19, and then sinks into the boiler 2 through the pipe 3. The water formed in the condenser 13 by the condensation of the steam rises in the pipe 18, partly owing to the existence of a higher pressure in the condenser 13. Owing to the relief from pressure in the upper part of the pipe 18 steam bubbles will be formed which will contribute to the rising of the liquid. The water is then vaporized in the evaporator 19, and effects cooling of the medium flowing through the jacket 20. As will be seen from the drawing no pump is required nor are any throttling or regulating valves necessary.

The apparatus is not limited to its use for refrigerating alone as the heat generated can also be utilized in any desired manner as is known in existing refrigerating apparatus. After the cooling water has passed through the pipe coils it may not be allowed simply to run off but its heat may be utilized in any suitable manner. Any other liquid or gaseous medium can also be used for being heated and subsequently employed (for example) for heating, saturating, chemical or other purposes by passing it through the pipe coils.

What I claim and desire to secure by Letters Patent of the United States is:—

1. In refrigerating apparatus of the absorption type the combination of a boiler for containing an absorption liquid and heating means for disengaging a vapor from the absorption liquid, an absorber for containing an absorption liquid and a vapor to be absorbed, and uninterrupted conduit interposed between the absorber and the boiler and adapted to convey the absorption liquid from the absorber to the boiler, and means for maintaining a pressure difference between the boiler and the absorber, said means including a hydrostatic column of liquid in said conduit.

2. In refrigerating apparatus of the absorption type the combination of a boiler for containing an absorption liquid and heating means for disengaging a vapor from the absorption liquid, an absorber for containing an absorption liquid and a vapor to be absorbed, an uninterrupted conduit interposed between the absorber and the boiler and adapted to convey the absorption liquid from the absorber to the boiler, means for maintaining a pressure difference between the boiler and the absorber, said means including a hydrostatic column of liquid in said conduit, and another conduit between the boiler and the absorber for conveying part of the disengaged vapor aforesaid to the absorber, said conduit being formed to hold a continuous column of liquid.

In witness whereof I affix my signature.

EDMUND ALTENKIRCH.